United States Patent
Oh et al.

(10) Patent No.: US 10,263,452 B2
(45) Date of Patent: Apr. 16, 2019

(54) WIRELESS CHARGING CONTROL METHOD AND APPARATUS IN WIRELESS POWER TRANSMISSION SYSTEM

(71) Applicant: Samsung Electronics Co., Ltd., Gyeonggi-do (KR)

(72) Inventors: Hun-Cheol Oh, Seoul (KR); Soo-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/911,999

(22) PCT Filed: Aug. 11, 2014

(86) PCT No.: PCT/KR2014/007439
§ 371 (c)(1),
(2) Date: Feb. 12, 2016

(87) PCT Pub. No.: WO2015/023092
PCT Pub. Date: Feb. 19, 2015

(65) Prior Publication Data
US 2016/0204642 A1 Jul. 14, 2016

(30) Foreign Application Priority Data
Aug. 13, 2013 (KR) .................. 10-2013-0095815

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/007* (2013.01); *H02J 17/00* (2013.01); *H02J 50/12* (2016.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 8,335,062 B2 * 12/2012 Haines .................. H02H 3/00
320/109
2010/0225272 A1 9/2010 Kirby et al.
(Continued)

FOREIGN PATENT DOCUMENTS

CN 101562360 10/2009
JP 2006041746 2/2006
(Continued)

OTHER PUBLICATIONS

European Search Report dated May 17, 2017 issued in counterpart application No. 14836576.0-1804, 10 pages.
(Continued)

*Primary Examiner* — Arun C Williams
(74) *Attorney, Agent, or Firm* — The Farrell Law Firm, P.C.

(57) ABSTRACT

The present disclosure provides a wireless charging control method. The wireless charging control method in an apparatus having a wireless power reception module, includes sensing an event in a wireless charging mode, determining whether the sensed event is a predetermined wireless-charging indirect-associated event, when the sensed event is a predetermined wireless-charging indirect-associated event, identifying a wireless charging operation corresponding to the wireless-charging indirect-associated event and controlling wireless charging according to the identified wireless charging operation.

19 Claims, 6 Drawing Sheets

(51) Int. Cl.
  *H02J 50/80* (2016.01)
  *H02J 17/00* (2006.01)
  *H02J 50/12* (2016.01)
  *H02J 50/60* (2016.01)
(52) U.S. Cl.
  CPC .............. *H02J 50/60* (2016.02); *H02J 50/80* (2016.02); *H02J 2007/0001* (2013.01)
(58) Field of Classification Search
  USPC ........................................................ 320/108
  See application file for complete search history.

(56) References Cited

U.S. PATENT DOCUMENTS

| | | | |
|---|---|---|---|
| 2011/0119144 A1 | 5/2011 | Grilli et al. | |
| 2011/0125929 A1 | 5/2011 | James et al. | |
| 2011/0221389 A1 | 9/2011 | Won et al. | |
| 2012/0052923 A1 | 3/2012 | Park | |
| 2012/0062173 A1 | 3/2012 | Choi et al. | |
| 2012/0098485 A1 | 4/2012 | Kang et al. | |
| 2012/0294463 A1 | 11/2012 | Chu et al. | |
| 2012/0295634 A1 | 11/2012 | Kim | |
| 2013/0082651 A1 | 4/2013 | Park et al. | |
| 2013/0342171 A1* | 12/2013 | Grivas | G06F 3/044 320/137 |
| 2014/0125277 A1* | 5/2014 | Van Wiemeersch | H01M 10/44 320/108 |
| 2015/0042287 A1* | 2/2015 | Liu | H02J 50/90 320/134 |

FOREIGN PATENT DOCUMENTS

| | | |
|---|---|---|
| KR | 1020110103296 | 9/2011 |
| KR | 1020110103297 | 9/2011 |
| KR | 1020110122728 | 11/2011 |
| KR | 1020120009628 | 2/2012 |
| KR | 1020120020661 | 3/2012 |
| KR | 1020120026789 | 3/2012 |
| KR | 1020120041628 | 5/2012 |
| KR | 1020120128315 | 11/2012 |
| KR | 1020120129347 | 11/2012 |
| KR | 1020130068921 | 6/2013 |
| WO | WO 2009/131990 | 10/2009 |

OTHER PUBLICATIONS

PCT/ISA/210 Search Report issued on PCT/KR2014/007439 (pp. 4).

Chinese Office Action dated Aug. 2, 2017 issued in counterpart application No. 201480045320.7, 32 pages.

Lu Zhang, "Analysis of Telephone Line Served as Charger for Mobile Phone", Chinese Hi-Tech Enterprises, Issue 3, Feb. 1, 2009, 2 pages.

Dawei Zhu et al., "Ni—Cd/Ni-MH Battery Charger Control Chip M62256FP for Handhold Telephones", Foreign Electronic Components, Issue 1, Jan. 22, 2012, 3 pages.

Chinese Office Action dated Mar. 12, 2018 issued in counterpart application No. 201480045320.7, 33 pages.

* cited by examiner

WIRELESS CHARGING CONTROL METHOD AND APPARATUS IN WIRELESS POWER TRANSMISSION SYSTEM

PRIORITY

This application is a National Phase Entry of PCT International Application No. PCT/KR2014/007439 filed on Aug. 11, 2014, which claims priority to Korean Patent Application Serial No. 10-2013-0095815 filed in the Korean Intellectual Property Office on Aug. 13, 2013, the entire content of each of which are incorporated herein by reference.

BACKGROUND

1. Field of the Disclosure

The present disclosure generally relates to a wireless power transmission (transmission/reception) technology (Wireless Power Technology, WPT or Wireless Energy Transfer) applied to a wireless charging technology and to a method and apparatus for controlling wireless charging according to a user environment.

2. Description of the Related Art

A mobile terminal, such as a mobile phone, a Personal Digital Assistant (PDA) and the like, is powered by a rechargeable battery due to the portable nature of the terminal, and electric energy is supplied to the battery of the mobile terminal by using a separate charging apparatus in order to charge the battery. Usually, the charging apparatus and the battery have separate contact terminals on the outside of the mobile terminal and are electrically connected to each other by mutual contact between the contact terminals. However, in such a contact-type charging arrangement, the contact terminals protrude outwardly, and thus are easily contaminated by foreign substances. As a result, battery charging is not correctly performed. Further, since the structure of a connector including the contact terminals differs between manufacturers of individual terminals and between nations, a charger corresponding to the connector of the terminal must be used for charging. A wireless charging or contactless charging technology can solve such problems. Such a wireless charging technology uses the wireless power transmission technology and the wireless power transmission technology refers to a technology that can transmit power without wires.

In the wireless charging technology, an electromagnetic induction scheme using a coil and a resonance scheme has emerged. In addition, an RF/Micro Wave Radiation scheme, which converts electric energy to a microwave and transmits the microwave has emerged. A power transmission method using electromagnetic induction corresponds to a scheme of transmitting power between a first coil of a transmission apparatus and a second coil of a reception apparatus. The resonance scheme corresponds to a scheme using a frequency resonance technology between the transmission apparatus and the reception apparatus, using a predetermined resonant frequency, and has the advantage of enabling a relatively-remote wireless power transmission, compared with the electromagnetic induction scheme.

The above-mentioned wireless charging technology is a very promising field thanks to the rapid increase of mobile terminal technologies and the extensive supply of various application products, but has problems relating to frequency allocation, potentially negative influences on a human body and the like. For example, as power transmission capacity becomes larger and the transmission distance becomes further, it is more likely that a human body is harmfully affected by exposure to an electromagnetic wave. Further, when other functions of a mobile terminal are used while wireless charging is being performing, a malfunction of the mobile terminal or user inconvenience may be caused due to the wireless charging electromagnetic wave.

SUMMARY

The present disclosure has been made to address the above problems and disadvantages and to provide at least the advantages described below.

Accordingly, an aspect of the present disclosure provides a wireless charging control method and apparatus that can reduce an influence of a wireless charging electromagnetic wave on a human body while a user's apparatus including a mobile terminal is being wireless charged, can reduce malfunctions, and can further increase user convenience.

According to an aspect of the present disclosure, a wireless charging control method, which receives wireless power to perform a wireless charging operation, performs sensing an event in a wireless charging mode; determining whether the sensed event corresponds to a wireless charging indirect-associated event, which is predetermined to be indirectly associated with a wireless charging operation, among non-wireless charging-related events; when the sensed event corresponds to the wireless charging indirect-associated event, identifying the wireless charging operation corresponding to the event; and controlling wireless charging according to the identified wireless charging operation.

According to another aspect of the present disclosure, a wireless charging control method, which receives wireless power to perform a wireless charging operation, comprises: when a wireless charging mode is performed, adjusting an operation environment of a predetermined call function according to call reception into a speaker call mode; determining whether a call reception event occurs while performing a wireless charging operation; when the call reception event has occurred, performing a call operation in the speaker call mode: when a human proximity state is sensed while the call operation is being performed, stopping the charging operation and performing a call in a receiver call mode; and when the human proximity state is not sensed while performing a call in the receiver call mode, starting the charging operation and performing a call in the speaker call mode.

According to another aspect of the present disclosure, a mobile terminal having a wireless charging function includes a touch screen that performs a display function relating to output information and an input function; a wireless power reception module that receives charging power provided from an external wireless power transmission apparatus; a power supply unit that receives charging power provided from the wireless power reception module and generates internal operation power of the corresponding mobile terminal; and a control unit that controls an operation of the corresponding mobile terminal as a whole by collectively controlling the respective functional units and that, when a wireless-charging indirect-associated event, which is predetermined to be indirectly associated with a wireless charging operation, among non-wireless charging-related events, occurs while a wireless charging operation is being performed, controls the wireless charging operation according to the occurred event.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
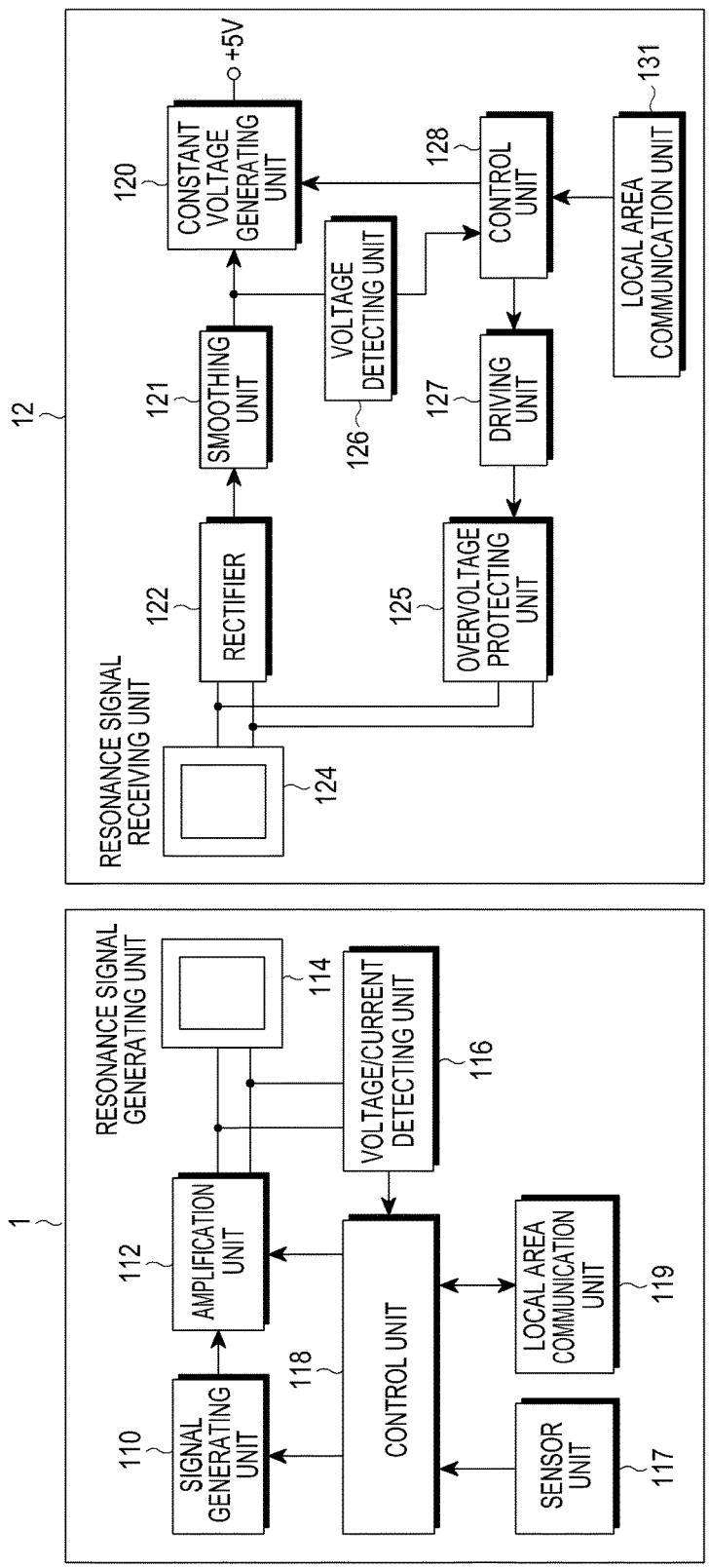
FIG. 1 is a block diagram of a resonance-type wireless power transmission/reception system according to an embodiment of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

FIG. 1 is a block diagram of a resonance-type wireless power transmission/reception system according to an embodiment of the present disclosure. Referring to FIG. 1, the resonance-type wireless power transmission/reception system includes a wireless power transmission apparatus 1 corresponding to a source apparatus that supplies charging power and a wireless power reception module 12, which may be included in a mobile terminal, corresponding to a target apparatus that is supplied with wireless power.

The wireless power transmission apparatus 1 includes a signal generating unit 110 that includes a Voltage Control Oscillator (VCO), etc. and generates a signal of a predetermined frequency, for example, a resonance frequency of 6.78 MHz, an amplification unit 112 that includes an amplifier, etc. and amplifies the signal generated by the signal generating unit 110 into a high output power signal, a resonance signal generating unit 114 that includes a resonator, etc. and generates a wireless resonance signal of 6.78 MHz according to the high output power signal generated by the amplification unit 112, a voltage/current detecting unit 116 that detects a peak level of voltage and current of the wireless resonance signal generated by the resonance signal generating unit 114 and a control unit 118 that collectively controls a wireless power transmission operation of the corresponding wireless power transmission apparatus 1, monitors a current and voltage of a resonance signal wirelessly transmitted according to the current and voltage detected by the voltage/current detecting unit 116, and controls operations of the signal generating unit 110 and the amplification unit 112 so that the current and voltage maintain a predetermined value in the normal range.

In addition, the wireless power transmission apparatus 1 includes a sensor unit 117 that includes an object sensing sensor, etc. in order to sense that the reception module 12 is placed thereon and provides a sensing signal to the control unit 118 and a local area communication unit 119 configured by for various wireless local communication schemes, for example, Zigbee, in order to communicate with the reception module 12 in relation to a wireless power transmission operation under control of the control unit 118.

The wireless power reception module 12 includes a resonance signal receiving unit 124 that includes a resonator, etc. and receives a wireless resonance signal transmitted by the resonance signal generating unit 114 of the wireless power transmission apparatus 1, a rectifier 122 that rectifies an alternating current (AC)-type power, which is received by the resonance signal receiving unit 124 to a direct current (DC)-type power, a smoothing unit 121 that smoothes (integrates) the DC power rectified by the rectifier 122, a constant voltage generating unit (regulator) 120 that converts power output by the smoothing unit 121 into operation power (for example, +5V) required by a mobile terminal, etc. to which the corresponding wireless power reception apparatus is applied, an overvoltage protecting unit 125 that in an overvoltage protecting operation, is driven by a driving unit 127 to detune a resonant frequency of a resonator of the resonance signal receiving unit 124, thereby reducing reception power level, the driving unit 127 that, in the overvoltage protecting operation, drives the overvoltage protecting unit 125 according to a control signal, a voltage detecting unit 126 that detects the input voltage of the constant voltage generating unit 120, and a (resonance) control unit 128 that collectively controls the wireless power reception operation of the corresponding wireless power reception module 12, determines whether a voltage is an overvoltage according to a detection signal of the voltage detecting unit 126, and when the voltage is determined to be an overvoltage, outputs a control signal to the driving unit 127 for driving the overvoltage protecting unit 125 for the overvoltage protection operation, the control unit 128 being implemented by a microcontroller unit (MCU) and the like.

In addition, the wireless power reception module 12 includes a local area communication unit 131 that is configured for various wireless local area communication schemes in order to communicate with the wireless power transmission apparatus 1 under control of the control unit 128 in relation to a wireless power reception operation and a waveform stabilization unit that includes an inductor capacitor (LC) circuit, and stabilizes and outputs a DC waveform from the constant voltage generating unit 120.

Figure 2:
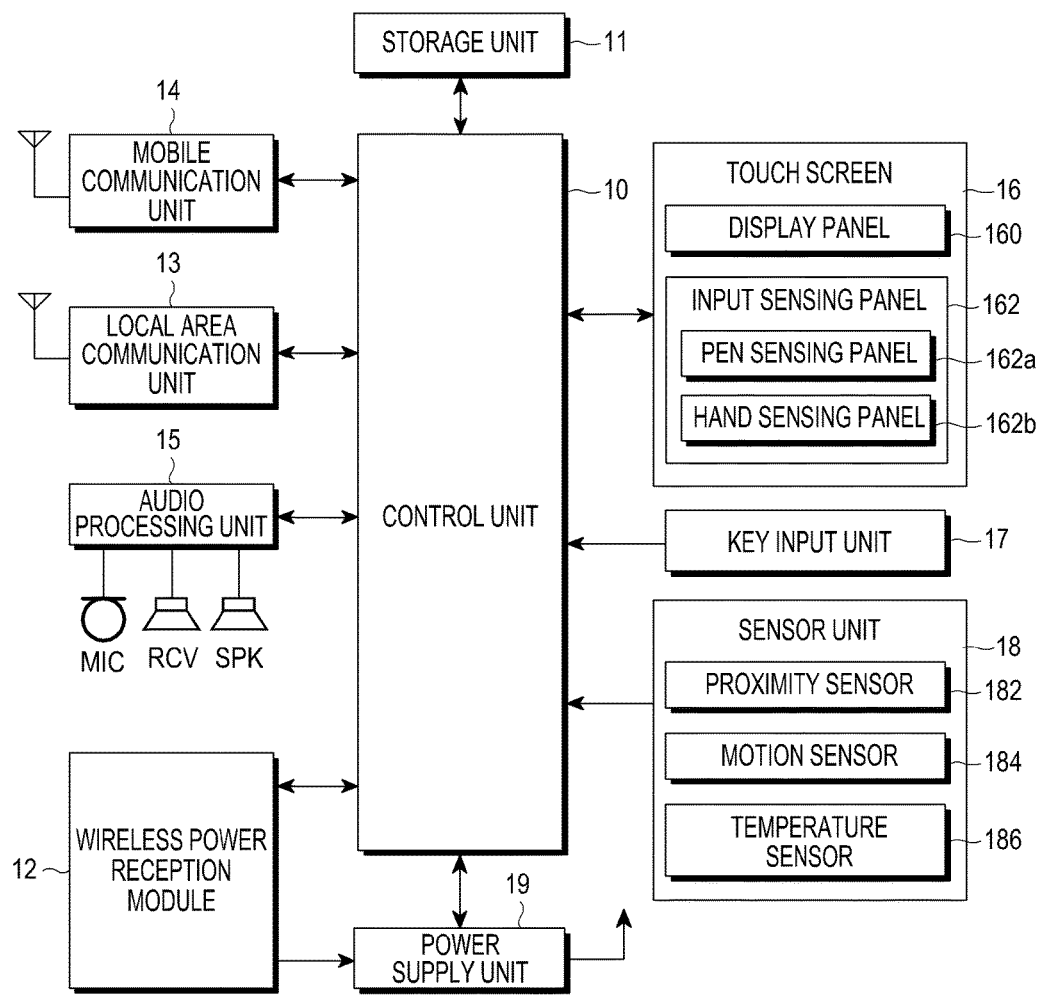
FIG. 2 is a block diagram of a mobile terminal having the wireless power reception module of FIG. 1 according to an embodiment of the present disclosure.

FIG. 2 is a block diagram of a mobile terminal having the wireless power reception module of FIG. 1. As illustrated in FIG. 2, a mobile terminal, according to an embodiment of the present disclosure, has the wireless power reception module 12, and a control unit 10, a storage unit 11, a mobile communication unit 14, a local area communication unit 13, an audio processing unit 15, a touch screen 16, a key input unit 17, and a sensor unit 18. The mobile terminal illustrated in FIG. 2 shows a structure corresponding to a smart phone, a mobile phone, and the like. In addition, a mobile terminal may include various apparatuses, such as a Potable Multimedia Player (PMP), a PDA, an MP3 player, a tablet PC, a personal navigation apparatus, a portable game apparatus, and the like. In this case, the mobile communication unit 14 illustrated in FIG. 2 may not be included.

Referring to FIG. 2, the touch screen 16 may include a display panel 160, which performs a display function relating to information output by a mobile terminal, and an input sensing panel 162, which performs various input functions by a user. The display panel 160 may be configured as a Liquid Crystal Display (LCD) screen or an Organic Light Emitting Diode (OLED) (e.g., PMOLED or AMOLED)

screen and may be implemented with the input sensing panel 162 structurally integrated. The display panel 160 may display various screens according to various operation states, menu states, application executions and services, etc. of the corresponding mobile terminal.

The input sensing panel 162 may be implemented by at least one panel that senses various inputs, such as a single or multi-touch input, a drag input, a writing input, a drawing input, and the like provided by a user using various objects such as a finger, an electronic pen, and the like. For example, the input sensing panel 162 may be implemented using one panel which can sense both a finger input and an electronic pen input or may be implemented using two panels such as a hand sensing panel 162b which can sense the finger input and a pen sensing panel 162a which can sense the electronic pen input.

The hand sensing panel 162b may sense a finger touch (contact) input or a finger proximity (non-contact or hover) input. The hand sensing panel 162b may have a form of, for example, a touch film, a touch sheet, a touch pad, etc. The hand sensing panel 162b senses a touch input and outputs a touch event value corresponding to a sensed touch signal. Information corresponding to the sensed touch signal may be displayed on the display panel 160. The hand sensing panel 162b may receive an operation signal by the touch input of the user through various input means. For example, the hand sensing panel 162b may sense a touch input including a user's body (for example, a finger) and a physical tool. Specifically, the hand sensing panel 162b may be a capacitive type touch panel. When the hand sensing panel 162b is a capacitance type touch panel, the hand sensing panel 162b may be configured by coating both sides of glass with a thin metal conductive material (for example, an Indium Tin Oxide (ITO) film or the like) to allow a current to flow on a surface of the glass and thus is coated with a dielectric that can store a charge. When a surface of the hand sensing panel 162b is touched by an object, a predetermined amount of the charge is moved to a contact position by static electricity, and the hand sensing panel 162b recognizes the current change according to the movement of the charge to sense the touched position and track a touch event. The touch event generated on the hand sensing panel 162b may be generated by a finger of a person but may be generated by another object which causes a change in capacitance, for example, a conductive object which causes the change in capacitance.

The pen sensing panel 162 senses a proximity input or contact input of the electronic pen according to the use of the electronic pen (for example, a stylus pen or a digitizer pen) and outputs a sensed electronic pen proximity event or electronic pen contact event. The pen sensing panel 162a may be implemented in an electromagnetic resonance (EMR) scheme and may sense a touch or proximity input according to a change in the intensity of an electromagnetic field by the proximity or touch of a pen. Specifically, the pen sensing panel 162a may include an electromagnetic induction coil sensor having a grid structure in which a plurality of loop coils are arranged in a predetermined first direction and a second direction crossing the first direction and an electronic signal processing unit sequentially providing an alternative current signal having a predetermined frequency to each of the loop coils of the electromagnetic induction coil sensor. When an electronic pen, which has a resonance circuit embedded therein, is near a loop coil of the pen sensing panel 162a, a magnetic field transmitted from the corresponding loop coil generates a current, which is based on mutual electromagnetic induction, in the resonance circuit within the electronic pen. Based on the amount of current produced, an induced magnetic field is generated from the coil included in the resonance circuit within the electronic pen. The pen sensing panel 162a detects the induced magnetic field from the loop coil in a signal reception state and senses a proximity position or touch position of the pen. Through the pen sensing panel 162a, the approach or touch of an object can be sensed, if the object generates the current based on the electromagnetic induction. The pen sensing panel 162a may have an activation state according to generation of a particular event or by default. Further, the pen sensing panel 162a may be arranged within a predetermined area, for example, an area to cover a display area of the display panel 160 below the display panel 160.

The mobile communication unit 14 is a unit which may be included when the corresponding mobile terminal supports a mobile communication function. Specifically, the mobile communication unit 14 may include an antenna, an RF unit, and a modem in order to perform a wireless signal transmitting/receiving and processing operation for the mobile communication function. The RF unit includes an RF transmitter that up-converts and amplifies a frequency of a transmitted signal, and an RF receiver that amplifies a received signal and down-converts a frequency. The modem includes a transmitter that codes and modulates a signal to be transmitted and a receiver that decodes and demodulates a signal received by the RF unit. The mobile communication unit 14 may perform a particular function of the mobile terminal, which is required to have a communication function, for example, a texting function, a message transmission/reception function, a call function, and the like.

The local area communication unit 13 includes a wireless LAN module or a local area communication module, such as Wi-Fi Direct, Near Field Communication (NFC), Bluetooth, Zigbee, and the like, to connect to the Internet at a place in which a wireless Access Point (AP) is installed, or to wirelessly perform a local area communication operation with peripheral apparatuses. In addition, a communication module such as Radio Frequency Identification (RFID), an infrared Data Association (IrDA), an Ultra Wideband (UWB), etc. may be used.

The sensor unit 18 includes a proximity sensor 182, a motion sensor 184, and a temperature sensor 186. The proximity sensor 182 is a sensor that detects, without a mechanical contact, whether an object approaches a mobile terminal or exists in the vicinity of the mobile terminal, and detects a proximate object by using a change in an AC magnetic field or a change in a static magnetic field or by using a change rate of capacitance and the like. The motion sensor 184 senses the position or motion of a mobile terminal by using an acceleration sensor, a gyro sensor, etc. The acceleration sensor, which can be used in the motion sensor 184, is an element that converts an acceleration change in any direction to an electric signal. The gyro sensor is a sensor that measures the angular velocity of a mobile terminal which performs a rotation motion, and may sense a rotated angle for each reference direction. For example, the gyro sensor may sense a rotation angle of each axis in three directions, that is, an azimuth, a pitch, and a roll, with reference to the axes in three directions. In addition, the sensor unit 18 may include a pressure sensor for sensing a pressure applied to the corresponding mobile terminal, an illumination sensor for sensing illumination, and the like. The temperature sensor 186 is a sensor for sensing an internal/external temperature of the mobile terminal, and sensors which have various types and structures for sensing a temperature may be adopted.

The key input unit 17 includes a key, which is mechanically included in an outer housing of the mobile terminal, for manipulating multiple operations and receiving a user's manipulation. Such a key may include a side key, a separately provided touch pad, etc. Further, the key input unit 17 may include a button key for turning on or turning off a mobile terminal, a home key that supports a return to a basic screen supported by the mobile terminal, etc.

The audio processing unit 15 includes a speaker SPK and a receiver RCV for outputting an audio signal of the mobile terminal, and a microphone MIC for collecting the audio signal. The audio processing unit 15 may include a voice codec, which processes an audio signal input and output through the speaker and the microphone, and when a phone call according to a mobile communication function is executed, the audio processing unit 15 receives a voice of a user or outputs an audible sound to the user, and outputs processing sounds corresponding to various operations or sounds corresponding to various digital audio content, video content, and the like. The receiver RCV is a low output power speaker through which a voice signal received during a call is output, and the speaker SPK outputs the voice signal or audio signal amplified through a predetermined amplification means. In a normal call mode, the voice is output through the receiver RCV, and when a music playing mode or a speakerphone mode is configured, the voice and the audio signal are output through the speaker. The audio processing unit 15 includes an internal switching means to switch the voice to be output through one of the receiver and the speaker according to a control signal of the control unit 10. The receiver may be properly formed at the front upper part of a mobile terminal, and the speaker may be properly formed at the rear surface of the mobile terminal. Further, the present embodiment describes an example in which the audio processing unit 15 includes both a speaker and a receiver, but the audio processing unit 15 may be implemented to include one speaker but not both the speaker and the receiver and operate in a speaker mode or a receiver mode through a change in the level of audio amplification.

The storage unit 11 is configured to store various programs and data required for a mobile terminal operation. For example, the storage unit 11 may include a program memory and a data memory for storing various application programs, related contents, data relating to operation processing, etc. The program memory stores a program for controlling general operations of the mobile terminal. The storage unit 11 prestores an operation program and related data for a wireless charging control operation in a wireless power transmission system according to an embodiment of the present disclosure.

The control unit 10 may collectively control the respective functional units to control overall operations of the mobile terminal, and may switch and control an operation of the mobile terminal according to a user input which is input through the touch screen 16 or the key input unit 17. Further, the control unit 10 performs a wireless charging control operation in the wireless power transmission system according to an embodiment of the present disclosure. The control unit 10 adjusts an operation environment of predetermined functions, which are related to wireless charging, the performing of a call and the processing of input sensing, during a wireless charging operation. A detailed operation of the control unit 10 will be described below.

The power supply unit 19 has a battery which is charged by the wireless power reception module 12, and supplies operation power to internal functional units. The wireless power reception module 12 may be configured as illustrated in FIG. 1. Further, it has been described that the control unit 128 of the wireless power reception module 12 is configured to be distinguished from the control unit 10 of the mobile terminal. However, the control unit 10 of the mobile terminal may be configured to perform, in parallel, a role of the control unit 128 of the wireless power reception module 12.

A mobile terminal according to an embodiment of the present disclosure may be implemented by including functional units as described above. In addition, the mobile terminal may additionally include functional units which are applied to the current mobile communication terminal, such as a GPS unit, a vibration motor, a camera module, and the like.

In a mobile terminal according to an embodiment of the present disclosure, a general wireless charging operation is described below. When a call is received during wireless charging and a user performs a call connection operation, a call operation starts. In this case, the call is performed in a receive call mode. When the user puts the mobile terminal against his/her ear and starts a call, a voice call is performed in which the mobile terminal is continuously charged, since the resonance scheme enables battery charging even at a distance of 1 to 2 meters. Since a charging pad of the wireless power transmission apparatus 1 continues to transmit transmission power to the wireless power reception module 12, a potential safety concern relating to the mobile terminal placed near the user's head may occur. Further, since charging is being performed, more heat is generated than in an idle state in which charging is not performed or a state in which other functions are used. Therefore, user inconvenience due to mobile terminal heating is created while making a call.

For wireless charging, the mobile terminal is generally put on the charging pad, and thus charging pad structures having various designs and additional uses are expected to be developed. For example, unlike a tray-type charging pad, a stand-type charging pad enables a user to watch a video while performing wireless charging. As described above, when the user desires to perform a call operation while wirelessly charging the mobile terminal in a state in which the mobile terminal is put on the charging pad or while watching a video, the user normally makes a call using a speaker mode. However, there may be user inconvenience in that the user must perform a call connection/rejection operation and then perform a separate menu selection operation to make a change into a speaker call mode.

As described above, in normal schemes, when a call is performed during wireless charging, the charging is continuously performed at a distance at which the charging can be performed. Further, in the case of a human body proximity call, inconvenience is caused due to heat generation. Even when a menu, which can control such a function is provided, the function must be controlled after a call reception has occurred. Therefore, in a situation in which the call reception has occurred, entering the menu to control the function is inconvenient to the user. In other words, when the user desires to make a call in a speaker mode in a state in which the mobile terminal is put on the charging pad, the user must go through the steps of receiving a call, selecting a menu key, selecting a speaker mode. Hence, there is inconvenience in having to select a menu and it takes a longer time to answer a call.

As described above, wireless charging has a considerable influence on normal operations of the mobile terminal while the mobile terminal is being charged. Therefore, it is necessary to adjust the conditions for performing the normal functions of the mobile terminal so that they are optimized during a wireless charging operation. For example, whether wireless charging is being performed may also have an influence on performing other functions of the mobile terminal, in addition to the above-described call operation. A terminal which supports an electronic pen function, may be provided as an example. Current smart phones include terminals which implement various input schemes and applications by applying an electronic pen technology. Under a wireless charging environment, a change occurs in the recognition rate of the electronic pen, therefore it is necessary to distinguish between a wireless charging situation and a non-wireless charging situation to correctly control an electronic pen input. In other words, the electronic pen technology is configured to generate a resonance on an electronic pen resonance circuit by forming an electromagnetic (EM) field and then measure a current produced by the resonance from an electronic pen. Therefore, when wireless charging is being performed in a terminal, a change may occur in the electronic pen recognition due interference from the wireless charging transmission power (TX POWER). In order to improve this, an input sensing threshold value of the electronic pen is properly changed and adjusted. In other words, through the comparison with a reference threshold value, an input sensing threshold value in the case of wireless charging is adjusted so as to compensate for the amount which is offset in the case of wireless charging.

As described above, according to an embodiment of the present disclosure, when an operation which is predetermined to be associated with wireless charging is performed during wireless charging, the corresponding operation environment is properly adjusted. Hereafter, this operation will be more specifically described with reference to FIG. 3.

Figure 3:
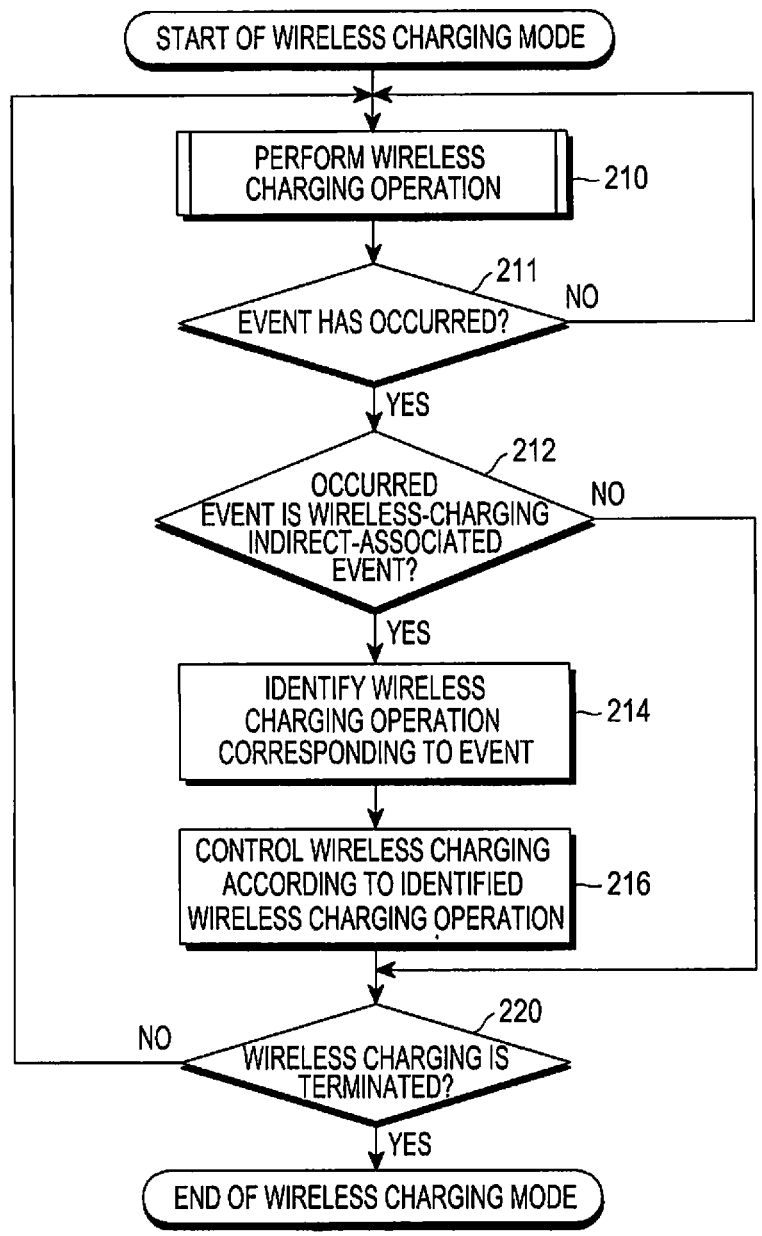
FIG. 3 is a flowchart of a wireless charging control operation according to an embodiment of the present disclosure.

FIG. 3 is a flowchart of a wireless charging control operation according to an embodiment of the present disclosure and the control operation may be performed under the control of the control unit 10 of the mobile terminal, as illustrated in FIG. 2. Referring to FIG. 3, when a wireless charging mode starts, a wireless charging operation is performed in step 210.

When a mobile terminal is placed on a charging pad of a wireless power transmission apparatus, the wireless power transmission apparatus senses when the mobile terminal is picked up through a sensor unit. Further, the mobile terminal may also be sensed through local area wireless communication. When the mobile terminal is sensed, the wireless power transmission apparatus determines if the mobile terminal is capable of wireless charging through authentication by ID exchange, performs a power transmission negotiation, and then starts power transmission, thereby starting a wireless charging mode between the wireless power transmission apparatus and a wireless power reception apparatus (i.e. a mobile terminal). When a wireless power transmission starts, the wireless power reception module 12 notifies the control unit 10 of the mobile terminal of the start of the wireless power transmission, and the control unit 10 sets a wireless charging state flag value showing that wireless charging is being performed and stores the state flag value in the storage unit 11.

In step 210, whether an event occurs during a wireless charging operation is continuously sensed. When an event occurs, the occurrence of the event is determined in step 211 and the process proceeds to step 212.

In step 212, whether the occurred event corresponds to an event (wireless-charging indirect-associated event) relating to a predetermined wireless-charging indirect-associated function is determined. When the occurred event corresponds to a wireless-charging indirect-associated event, the process proceeds to step 214. When the wireless-charging indirect-associated event does not occur, the control unit determines whether the non-occurrence of the event corresponds to a wireless charging termination condition, as in step 220. When the non-occurrence of the event does not correspond to the wireless charging termination condition, the wireless charging operation in step 210 is continuously performed. Examples of the wireless charging termination condition may include when a mobile terminal is at a distance at which the mobile terminal cannot be wirelessly charged and when the mobile terminal battery is confirmed to be in a fully charged state.

The process proceeds to step 214 when the wireless-charging indirect-associated event is confirmed to have occurred in step 212, and a wireless charging operation corresponding to the occurred event is identified. Thereafter, in step 216, the control unit controls a wireless charging operation according to the wireless charging operation and proceeds to step 220.

More specifically, the wireless-charging indirect-associated event in step 212 refers to an event relating to wireless-charging indirect-associated functions, which are predetermined to be indirectly associated with a wireless charging operation, among various non-wireless charging-related events which are not directly associated with the wireless charging. Examples of the wireless-charging indirect-associated event may include a call event, a user input event, a temperature change event, etc. In other words, the present disclosure configures, as wireless charging indirect-related functions, some functions which are directly associated with wireless charging, such as operations related to the start and end of a wireless charging operation and signal transmission/reception for the wireless power transmission apparatus 1 and a wireless charging control, and among various non-wireless charging-related applications or functions, which are not directly associated with wireless charging, in consideration of the influence of an electromagnetic wave on the corresponding function according to a wireless charging operation, wherein the functions are pre-classified as affecting a wireless charging operation or as indirectly affected by the wireless charging operation.

Further, the wireless charging operation in step 214 corresponds to at least one of a wireless charging (temporary) stop, a charging standby, and a charging current reduction or increase, and in step 216, the control unit controls the wireless charging operation according to the identified wireless charging operation.

For example, when the wireless-charging indirect-associated event corresponds to a call event, the operation of controlling wireless charging may correspond to one of a charging stop and a charging standby. In other words, when a call event occurs while wireless charging is being performed, the control unit (temporarily) stops the charging or performs a charging standby operation in order to reduce any potential influence of a wireless charging electromagnetic wave. Further, the above-described call event may include not only a call event according to the speaker call mode but also a receiver call mode in a case of human body proximity. In the case of the receiver call mode, the control unit is configured to stop a wireless charging operation or to be on charging standby.

Further, when the wireless-charging indirect-associated event corresponds to a user input event, such as a finger touch input, a finger proximity input, an electronic pen touch input, an electronic pen proximity input, and the like, the wireless charging control operation may correspond to one of a charging stop, a charging standby, and a charging current reduction.

Further, the above-described wireless-charging indirect-associated event may be a temperature change event. For example, when the external temperature of the corresponding mobile terminal rises above a predetermined reference value, the control unit may be configured to consider the temperature rise as a temperature change by human body contact and then perform one of a wireless charging stop, a charging standby, and a charging current reduction. Further, when the internal temperature of the corresponding mobile terminal rapidly rises, the control unit may be configured to consider the mobile terminal to be in an abnormal charging state and to perform an operation for (temporarily) stopping the wireless charging operation.

In step 216, an operation of controlling a wireless charging operation according to the identified wireless charging operation may include an operation of generating a wireless charging control signal relating to an operation of a wireless charging stop, a charging standby, or a charging current reduction, and transmitting the generated signal to a wireless power transmission apparatus (reference numeral 1 in FIG. 1). Therefore, the corresponding wireless power transmission apparatus performs an operation of the wireless charging stop, the charging standby, or the charging current reduction. Further, in addition to or together with the above-described operation, the control unit may be configured to control the corresponding wireless power reception module 12 to perform an operation such as a wireless charging stop, a charging standby, etc.

Figure 4:
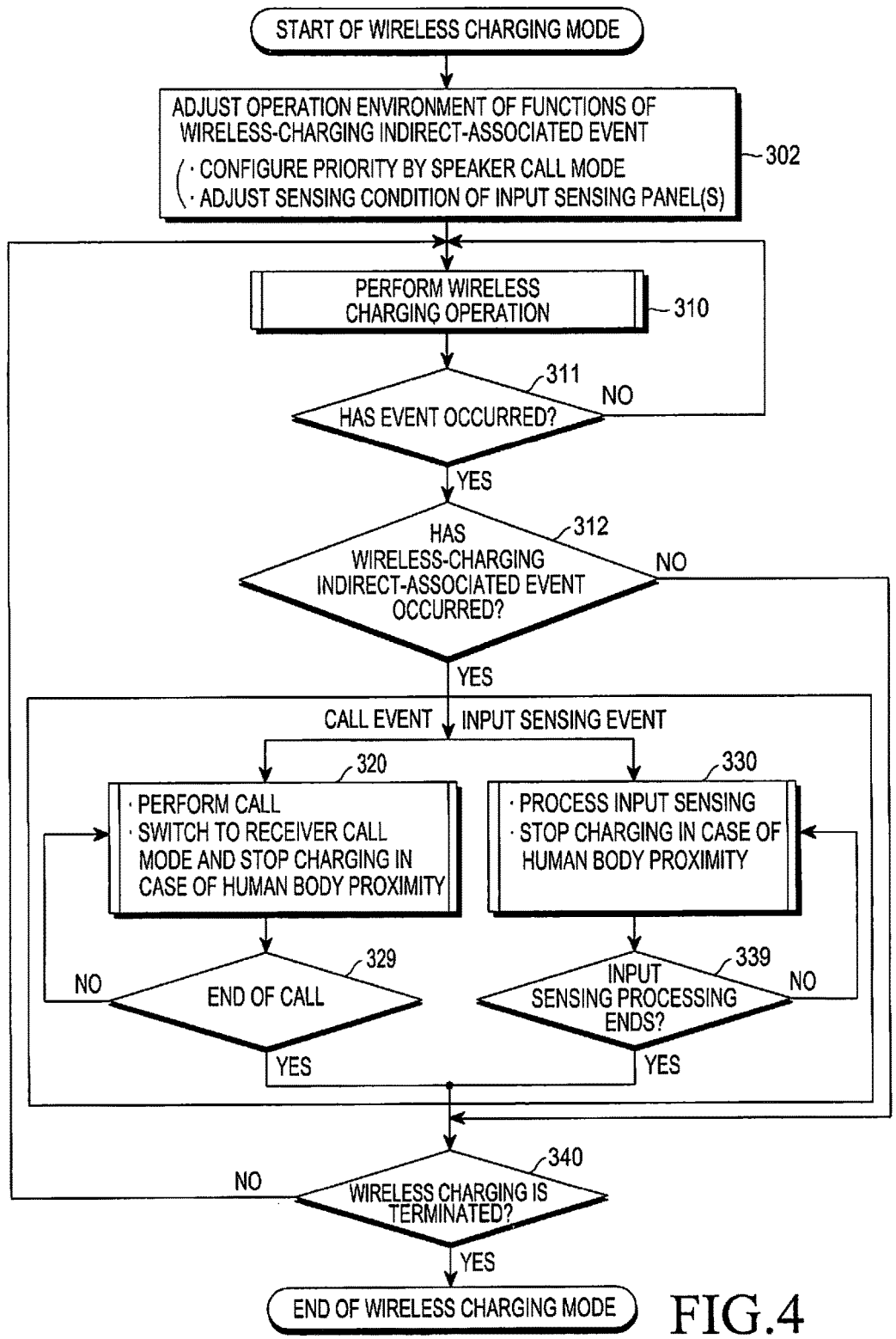
FIG. 4 is a flowchart of a wireless charging control operation according to another embodiment of the present disclosure.

FIG. 4 is a flowchart of a wireless charging control operation according to another embodiment of the present disclosure and the wireless charging control operation may be performed under the control of the control unit 10 of the mobile terminal illustrated in FIG. 2. Referring to FIG. 4, when a wireless charging mode starts, an operation environment of predetermined wireless charging-associated functions is adjusted in step 302.

When a mobile terminal is placed on a charging pad of a wireless power transmission apparatus, the wireless power transmission apparatus senses when the mobile terminal is picked up through a sensor unit. The mobile terminal may also be sensed through local area wireless communication. When the mobile terminal is sensed, the wireless power transmission apparatus determines if the mobile terminal is capable of wireless charging through authentication by ID exchange, performs a power transmission negotiation, and then starts power transmission, thereby starting a wireless charging mode between the wireless power transmission apparatus and a wireless power reception apparatus (i.e. a mobile terminal). When a wireless power transmission starts, the wireless power reception module 12 notifies the control unit 10 of the mobile terminal of the start of the wireless power transmission, and the control unit 10 indicates a wireless charging state flag value corresponding to wireless charging state and stores the state flag value in storage unit 11.

In step 302, the adjusting of the operation environment of the wireless charging-associated functions is, for example, to give priority to a speaker call mode in the case of a call operation and to change an input sensing condition in an input sensing panel(s) to a wireless charging mode sensing condition. More specifically, when the wireless charging state flag value stored in the storage unit 11 indicates that wireless charging is being performed, the control unit 10 of the mobile terminal changes a priority from the existing receiver call mode priority to a speaker call mode priority. Further, an input sensing threshold value of an electronic pen is adjusted into a predetermined input sensing threshold value at the time of wireless charging.

In step 310, a wireless charging operation is performed. The control unit 10 continuously senses whether an event occurs while such a wireless charging operation is being performed. When the event occurs, the control unit 10 determines the occurrence of the event in step 311 and then proceeds to step 312.

In step 312, the control unit determines whether the occurred event corresponds to an event relating to predetermined wireless-charging indirect-associated functions, that is, a wireless-charging indirect-associated event (for example, a call event or an input sensing event), and thereafter proceeds to step 320 or step 330 depending on the type of event. When the wireless-charging indirect-associated event does not occur, the control unit 10 determines whether the non-occurrence of the event corresponds to a wireless charging termination condition, as in step 340. When the non-occurrence of the event does not correspond to a wireless charging termination condition, the wireless charging operation of step 310 is continuously performed. Examples of the wireless charging completion condition may include a case where a mobile terminal is at a distance at which the mobile terminal cannot be wirelessly charged or a case where the mobile terminal battery is confirmed to be in a fully charged state.

When the wireless-charging indirect-associated event is, in step 312, determined to have occurred and the corresponding event corresponds to a call event, the control unit 10 proceeds to step 320 and performs a call operation in the speaker call mode to which a priority is currently given. In this case, when a human body proximity is sensed, the control unit 10 switches the speaker call mode into the receiver call mode and (temporarily) stops a charging operation. As described above, when an operation of performing a call in step 320 is terminated, the control unit 10 confirms the termination in step 329 and then proceeds to step 340 to determine whether the wireless charging has been terminated. When the wireless charging has not ended, the control unit returns to step 310 and repeats the operation.

In step 312, when the wireless-charging indirect-associated event is determined to have occurred and the corresponding event corresponds to an input sensing event, the control unit proceeds to step 330 to perform an input sensing processing operation. In this case, when human body proximity is sensed, the control unit (temporarily) stops the charging operation. As described above, when the input sensing processing operation of step 330 is terminated, the control unit 10 confirms the termination in step 339 and then proceeds to step 340 to determine whether the wireless charging has ended. When the wireless charging has not ended, the control unit returns to step 310 and repeats the operation.

Figure 5:
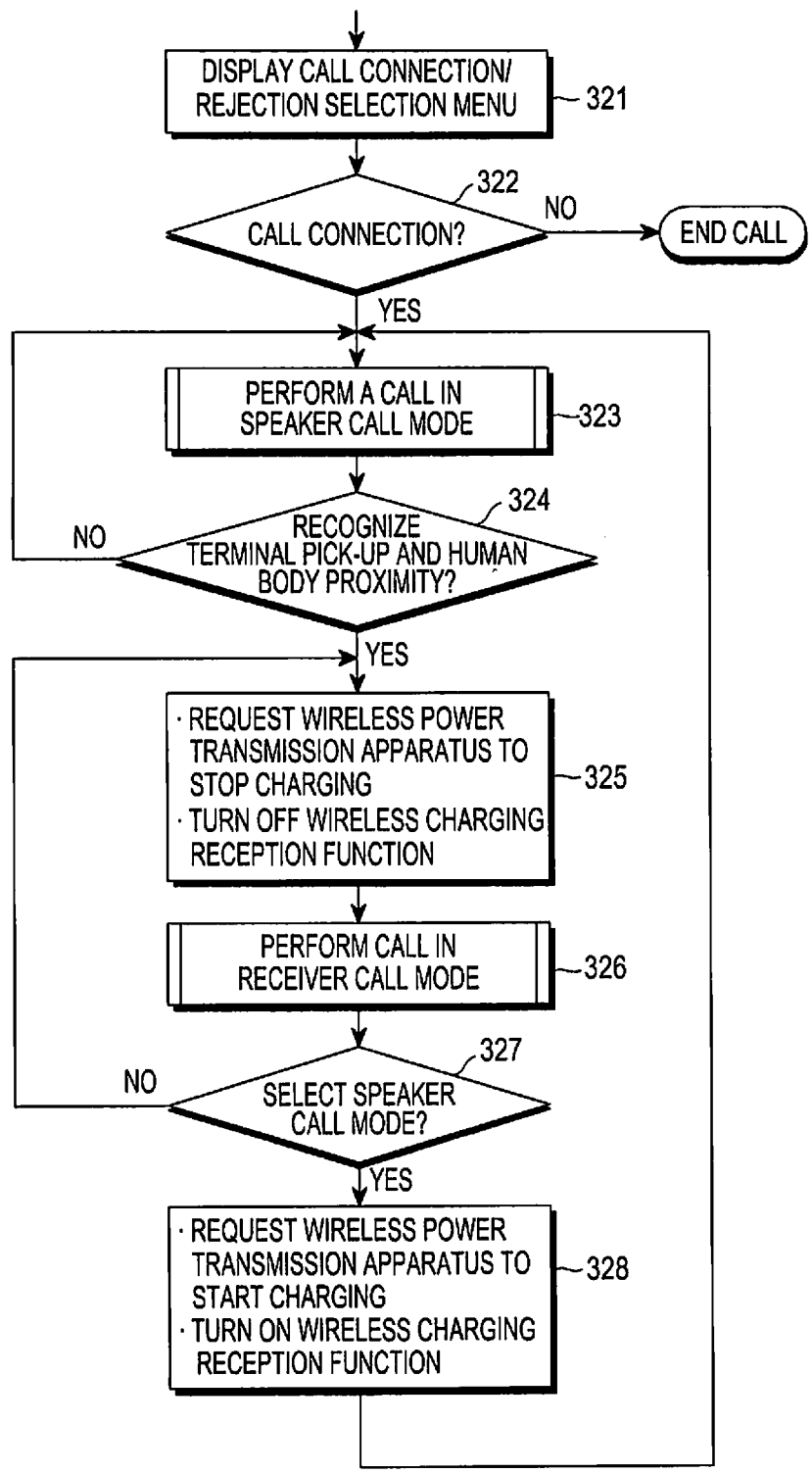
FIG. 5 is a flowchart of an operation for performing a call in FIG. 4 according to an embodiment of the present disclosure.

FIG. 5 is a flowchart of an operation of performing a call in FIG. 4 and illustrates an operation of performing a call in the case of the occurrence of a call termination event. Referring to FIG. 5, in step 321, the control unit 10 notifies the user, through a display unit, that a call has been received, and displays a call connection/rejection selection menu. The control unit 10 may notify the user, through a screen display or other methods, that since wireless charging is currently being performed, a call path is configured as the speaker call mode priority.

When a user operates a call connection/rejection selection, the control unit identifies the selection operation in step 322. When the user has operated a call connection selection, the process proceeds to step 323, and when the user has operated a call rejection selection, the call ends.

In step 323, a call is made in a speaker call mode. In step 323, when a terminal pick-up and a human body proximity state are recognized, the terminal pick-up and the human body proximity state are confirmed in step 324 and then the process proceeds to step 325. Otherwise, a call is made in the speaker call mode in step 323. Step 323 ends when the call ends.

According to an embodiment of the present disclosure, when a call mode is executed when charging is in progress, the control unit 10 activates a sensor unit 18 and senses an input change value of the sensor unit 18. The activated sensor unit 18 senses the motion of a terminal and the proximity to a user. When the user has selected a call connection selection menu item during wireless charging to enter a speaker mode, a high-priority call mode is entered. As described above, the speaker mode is selected by priority during wireless charging. However, the user may desire to make a call in a receiver call mode according to a surrounding environment or as necessary. When the user wants the receiver call mode and thus puts a mobile terminal against his/her ear by moving the mobile terminal, the sensor unit 18 transfers, to the control unit 10, data which is sensed through a motion sensing sensor such as a acceleration sensor, and a distance sensing method such as a proximity sensor. The control unit 10 acquires information on the motion and the proximity through the data transferred from the sensor unit 18. The control unit 10 determines, on the basis of such information, a situation in which the user has put the mobile terminal against his/her ear by moving the mobile terminal. In other words, when a call is received in a wireless power transmission state and the user puts a mobile terminal against his/her ear by moving the mobile terminal after selecting a call selection menu, the control unit 10 determines such an operation through the sensor unit 18.

As described above, when the user desires to make a call in the receiver call mode, the control unit proceeds to step 325 and requests a wireless power transmission apparatus to stop transmitting transmission power to the corresponding mobile terminal, through inband wireless communication or outband wireless communication. Therefore, the wireless power transmission apparatus stops a wireless charging operation for the mobile terminal according to the above-described request. At this time, the wireless power transmission apparatus, which receives the request of the mobile terminal, confirms identification (ID) information relating to the corresponding mobile terminal, stops power transmission for the corresponding ID information, and then is on standby for a predetermined time. When a charging start request is not made again even though the predetermined time has passed, the wireless power transmission apparatus stops the standby mode and terminates power transmission. In addition to the wireless power transmission apparatus, the control unit 10 controls the wireless power reception module of the corresponding mobile terminal itself to turn off the wireless charging operation. The wireless power reception module controls a switch on a wireless charging path according to control of the control unit 10, or disables wireless charging through a required method.

In step 326, a call is made in the receiver call mode. When the control unit senses, through the sensor unit 18, an operation in which the user desires the receiver call mode, the control unit 10 stops charging as described above, and changes the speaker call mode which the user has entered according to charging condition priority, to the receiver call mode. The control unit 10 controls a voice, which is received through a wireless transmission/reception unit 14, to be output to a receiver through an audio processing unit 15. Further, the control unit 10 changes the sensitivity of a microphone, thereby changing the user voice input level to be suitable for the receiver call mode.

As described above, even in the range in which wireless charging may be performed, the mobile terminal stops wireless charging through stopping power transmission from a charging pad and stopping the performance of charging by the terminal according to the user's operation which desires the receiver call mode. As a result, concerns related to wireless power transmission during a call is reduced and heat generation of the terminal is also. According to an embodiment of the present disclosure, such an operation may be more carefully controlled by monitoring the current battery charge level of a mobile terminal. When the battery charge level is determined not to satisfy the minimum call time, the control unit 10 may allow the terminal to notify a user that charging must be maintained or to adaptively determine whether to charge according to the battery charge level and a call mode state.

In the process of performing a call in the receiver call mode, when a selection operation for the speaker call mode is performed, the control unit 10 confirms the selection operation in step 327 and then proceeds to step 328. Otherwise, a call is performed in the receiver call mode in step 326. Step 326 ends when the call ends.

When the user takes the mobile terminal away from his/her ear by moving the mobile terminal while performing a call in the receiver mode, the control unit receives data of the sensor unit 18 and determines whether the speaker call mode is selected by the user. When the speaker call mode is activated according to the user's selection input, the process proceeds to step 328.

In step 328, the control unit 10 requests the wireless power transmission apparatus to start charging, causes a wireless charging function be turned-on, and returns to step 323 to repeatedly perform an operation of performing a call in the speaker call mode. More specifically, the control unit 10 determines whether the mobile terminal is in a chargeable range. The determination on whether the mobile terminal is in a chargeable range may be made by exchanging information through inband and outband communications after identifying an iLoad (load current) value in the wireless power transmission apparatus, and also includes other methods. When the mobile terminal is determined to be in the chargeable range, the control unit 10 communicates with the wireless power transmission apparatus, and when the mobile terminal is still in a standby mode, the control unit 10 requests the wireless power transmission apparatus to restart transmitting transmission power to the corresponding mobile terminal. If charging has been terminated due to the lapse of a standby time, the control unit 10 performs initialization again and then starts wireless charging through ID information identification and an impedance matching control. In this case, the control unit 10 controls a wireless charging switch through the wireless power reception module and switches to a wireless charging state. Therefore, the wireless charging is performed again.

Through the operations as illustrated in FIG. 5, a call operation at the time of call termination, according to an embodiment of the present disclosure, may be performed. It will be understood that a call operation at the time of call origination may also be performed in the same manner.

Figure 6:
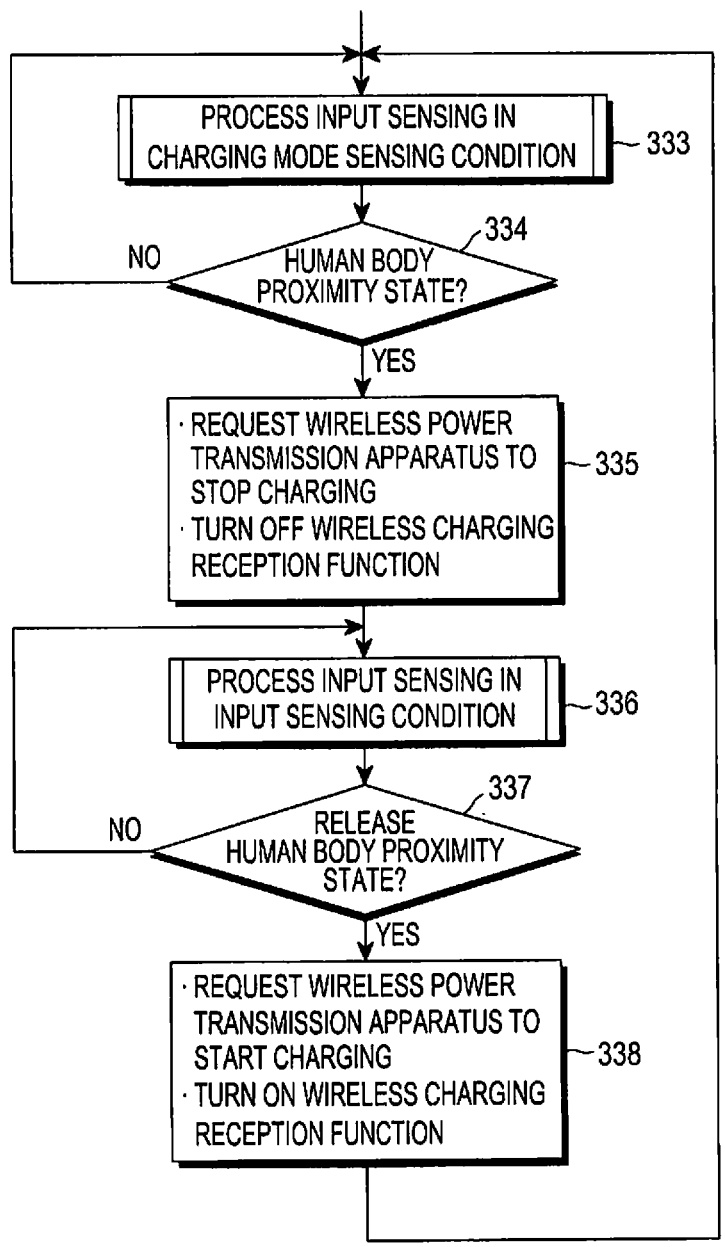
FIG. 6 is a flowchart of an input sensing processing operation in FIG. 4 according to an embodiment of the present disclosure.

FIG. 6 is a flowchart of an input sensing processing operation in FIG. 4 and illustrates an input sensing processing operation performed in the case of an electronic pen input sensing event. Referring to FIG. 6, in step 333, an input sensing processing operation is performed according to a sensing condition configured in a charging mode. In this state, when a human body proximity state is recognized, the human body proximity state is confirmed in step 334 and then the process proceeds to step 335. Otherwise, the input sensing processing operation is again performed in step 333. Step 333 ends when a processing operation corresponding to the input sensing processing operation is complete or human body proximity state is detected in step 334.

In step 335, the control unit 10 requests a wireless power transmission apparatus to stop charging and turns off a wireless charging reception function.

In step 336, the input sensing processing operation is performed according to a general sensing condition. When the human body proximity state is released while step 336 is being performed, the release of the human body proximity state is confirmed in step 337 and the process proceeds to step 338. Otherwise, the input sensing processing operation is performed in step 336. Step 336 ends when a processing operation corresponding to the input sensing processing operation is complete or the human body proximity state is released in step 337.

In step 338, the control unit 10 requests the wireless power transmission apparatus to start charging, turns on a wireless charging function and returns to step 323 to repeatedly perform the input sensing processing operation in the sensing condition configured in the charging mode.

Through the operations as illustrated in FIG. 6, a processing operation in the case of the occurrence of the electronic pen input sensing event according to an embodiment of the present disclosure may be performed. It will be understood that an input processing operation in the case of sensing a hand touch input may also be performed in the same manner.

As described above, a wireless charging control scheme in a wireless power transmission system according to an embodiment of the present disclosure may be performed. The description has been made with reference to particular embodiments of the present disclosure. In addition, there may be other various embodiments and changes or modifications thereof.

For example, in the description related to FIG. 4, it is described that a sensing threshold value of an electronic pen is changed in a charging mode and in a normal mode. In addition, the control unit 10 may also perform an operation that allows the wireless power transmission apparatus to adjust transmission power, thereby reducing interference. Further, a current generated in the electronic pen may also be adjusted. Further, a determination on an electronic pen use may be made through an operation of pulling out the electronic pen from the portable terminal or the execution of an electronic pen-related application, and the interference may be mitigated by using an optimal method according to a terminal configuration among the above-presented methods or by using different methods according to different situations.

As described above, a wireless charging control method in a wireless power transmission system according to the present disclosure can properly control, for example, a wireless charging operation according to an operation of a user apparatus in a resonance type wireless charging environment, thereby reducing heat generation of a terminal and an influence on a human body. The wireless charging control method can prevent functional malfunctions, including the reduction of input sensing malfunction in an electronic pen use or touch input environment. Further, the wireless charging control method can provide user convenience by the automatic conversion of speaker/receiver call modes.

Further, as described above, it is preferable that embodiments of the present disclosure should apply to resonance type wireless charging operations. However, embodiments of the present disclosure may be also similarly applied to an induction-type wireless charging.

Further, in the above description, the input sensing processing operation is described using examples relating to an electronic pen input or hand touch input sensing processing. In addition, the present disclosure may also be applied to a fingerprint input sensing processing in a mobile terminal including a fingerprint recognition panel.

Further, in the above description, events corresponding to a hand touch or a pen touch have been described as examples of a user input event. In addition, a configuration may be implemented such that various input events through the key input unit, and a camera operation event are also similarly processed.

It will be appreciated that the embodiments of the present disclosure can be implemented in a form of hardware, software, or a combination of hardware and software. Any such software may be stored, for example, in a volatile or non-volatile storage device such as a read only memory (ROM), a memory such as a random access memory (RAM), a memory chip, a memory device, or a memory integrated circuit (IC), or a recordable optical or magnetic medium such as a compact disk (CD), a digital versatile disk (DVD), a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the exemplary embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Various embodiments disclosed herein are provided merely to describe technical details of the present disclosure and to help the understanding of the present disclosure, and do not limit the scope of the present disclosure. Therefore, it should be construed that all modifications and changes or modified and changed forms based on the technical idea of the present disclosure fall within the scope of the present disclosure. Thus, the scope of the present disclosure should not be limited to the above-described embodiments of the present disclosure, but should rather be defined by the appended claims and equivalents thereof.

The invention claimed is:

1. A non-transitory storage medium storing instructions that, when executed by a processor, in an apparatus having a wireless power reception module, cause the processor to:
   sense an event in a wireless charging mode;
   determine whether the sensed event is a predetermined event;
   when the sensed event is the predetermined event, identify a wireless charging operation corresponding to the predetermined event; and control wireless charging according to the identified wireless charging operation,
wherein the predetermined event corresponds to at least occurrence of a call event on the apparatus.

2. The non-transitory storage medium of claim 1, wherein the predetermined event further corresponds to at least one of a user event and a temperature change event.

3. The non-transitory storage medium of claim 1, wherein the wireless charging operation is at least one of a wireless charging stop, a wireless charging standby, and a wireless charging current level change.

4. The non-transitory storage medium of claim 3, wherein controlling the wireless charging according to the identified wireless charging operation comprises generating a wireless charging control signal according to the wireless charging operation and transmitting the generated wireless charging control signal to a wireless power transmission apparatus.

5. The non-transitory storage medium of claim 3, wherein controlling the wireless charging according to the identified wireless charging operation controls the wireless power reception module according to the wireless charging operation.

6. The non-transitory storage medium of claim 1, wherein the call event is an event using a receiver.

7. The non-transitory storage medium of claim 6, wherein the call event using the receiver occurs by sensing human body proximity.

8. The non-transitory storage medium of claim 2, wherein, when the predetermined event further corresponds to the user input event, controlling the wireless charging corresponds to one of a wireless charging stop, a wireless charging standby, and a wireless charging current level reduction.

9. The non-transitory storage medium of claim 8, wherein the user input event corresponds to at least one of a finger touch input, a finger proximity input, an electronic pen touch input, and an electronic pen proximity input.

10. The non-transitory storage medium of claim 1, wherein, when entering the wireless charging mode, an operation environment of a predetermined function associated with a wireless charging control is adjusted according to the wireless charging mode.

11. The non-transitory storage medium of claim 10, wherein the predetermined function associated with wireless charging control is a call function, and the operation environment adjustment is to adjust a speaker call mode to have priority.

12. The non-transitory storage medium of claim 10, wherein the function associated with the wireless charging control corresponds to an input sensing processing function and the operation environment adjustment adjusts an input sensing threshold value to a predetermined input sensing threshold value at the time of wireless charging.

13. A non-transitory storage medium storing instructions that, when executed by a processor, cause the processor to:
when a wireless charging mode is performed, adjust an operation environment of a predetermined call function according to call reception into a speaker call mode;
determine whether a call reception event occurs while performing a wireless charging operation;
when the call reception event occurs, perform a call operation in the speaker call mode;
when a human proximity state is sensed while the call operation is being performed, stop the wireless charging operation and perform the call in a receiver call mode; and
when the human proximity state is not sensed while performing the call in the receiver call mode, start the wireless charging operation and perform the call in the speaker call mode.

14. The non-transitory storage medium of claim 13, wherein stopping the wireless charging operation further comprises requesting a charging stop to a wireless power transmission apparatus and turning off a wireless charging reception function.

15. A mobile terminal having a wireless charging function, the mobile terminal comprising:
a touch screen configured to perform a display function relating to output information and an input function;
a wireless power reception module configured to receive charging power provided from an external wireless power transmission apparatus;
a power supply unit configured to receive charging power provided from the wireless power reception module and generate internal operation power for the mobile terminal; and
a control unit configured to control operation of the mobile terminal by controlling respective functional units and, when a predetermined event occurs while a wireless charging operation is being performed, controls the wireless charging operation according to the predetermined event,
wherein the predetermined event corresponds to at least occurrence of a call event on the apparatus.

16. The mobile terminal of claim 15, further comprising:
a mobile communication unit that performs wireless signal transmitting and receiving;
a proximity sensor for sensing object proximity; and
a temperature sensor for sensing a temperature,
wherein the predetermined event further corresponds to a user input event and a temperature change event, and the wireless charging operation corresponds to at least one of a wireless charging stop, a wireless charging standby, and a wireless charging current level change.

17. The mobile terminal of claim 16, wherein controlling the wireless charging by the control unit comprises generating a wireless charging control signal according to the wireless charging operation, transmitting the generated wireless charging control signal to the wireless power transmission apparatus, and controlling the wireless power reception module.

18. The mobile terminal of claim 16, wherein, when the wireless charging operation is performed, the control unit adjusts an operation environment of a predetermined function associated with a wireless charging control into a state according to a wireless charging mode.

19. The mobile terminal of claim 18, wherein the predetermined function associated with the wireless charging control corresponds to a call function, and the operation environment adjustment adjusts a speaker call mode to have priority.

* * * * *